3,348,122
REGULATED POWER SUPPLY
Paul G. Todd, Great Neck, N.Y., assignor to Trygon Electronics, Inc., Roosevelt, N.Y., a corporation of New York
Filed Dec. 22, 1964, Ser. No. 420,379
3 Claims. (Cl. 321—18)

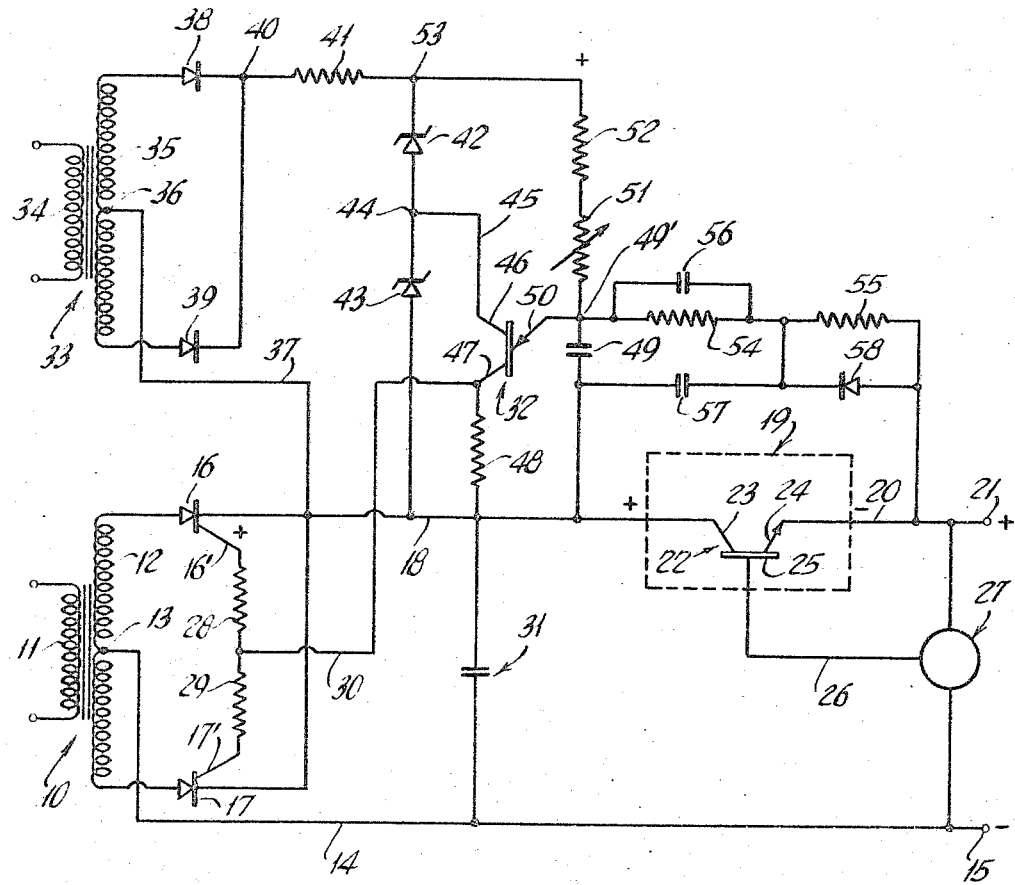

This invention relates to regulated power supplies and more specifically to a novel and improved circuit and method of operation for regulating and controlling the magnitude of direct current applied to the input of voltages and/or current regulating means to effect improved regulation and at the same time minimize the current carrying requirements of the series regulating elements of the power supply.

Power supplies for providing regulated direct current usually employ one or more series regulators, such as transistors or the like, which function as variable series impedances to control either current or voltage or both current and voltage in a load. The series regulators are controlled by an appropriate feed-back loop which senses current or voltage variations in the load and produces an error signal which controls the regulators. Under these conditions, the series regulators are required to handle substantial amounts of power, and, heretofore, power supplies have generally embodied devices of relatively high current capacity. Efforts have also been made to minimize the power dissipating requirements of series regulators by modifying the voltage applied thereto, but such systems have not been found to be entirely satisfactory for a number of reasons, such as slow response and undue complication, the latter resulting in a substantial increase in manufacturing and maintenance costs.

This invention overcomes these aforementioned difficulties and provides a novel and improved control circuit and method of operation for regulating the magnitude of the direct current fed to the series regulators and thereby limit the power needed to be dissipated by the regulators throughout the entire range of operation of the supply.

Another object of the invention resides in a novel and improved circuit for regulating the direct current fed to the series regulators of the power supply which is characterized by its simplicity, dependability, relatively low cost and rapid response to changes in the output voltage or current, as the case may be.

Still another object of the invention resides in a novel and improved circuit and method of operation for controlling the magnitude of direct current.

The above and other objects and advantages of the invention will become more apparent from the following description and accompanying drawings illustrating one embodiment of a circuit diagram in accordance with the invention.

As pointed out above, the invention concern an improved circuit and method of operation for control of a primary source of direct current which is then applied to a series regulator for producing a precisely regulated voltage or current. While it will become apparent as the description proceeds that the invention may be used in a variety of ways to effect the end result, the form of the invention now to be described provides for the utilization of the voltage drop across a series regulator or regulators to control the magnitude of direct current applied to the regulators. It will become evident that the control voltage can be obtained from any suitable part of the system. However, since control of the input voltage to the regulators has as one of its more important objects a reduction of power dissipation requirements for the series regulators, the utilization of the voltage drop across the regulators is most effective for the attainment of that end and affords a most dependable and reliable system.

Referring now to the drawing, the numeral 10 denotes a power transformer having an input winding 11 and a tapped secondary 12. The centertap 13 of the secondary is connected via the conductor 14 to the negative output terminal 15. The outer ends of the secondary 12 are connected through silicon controlled rectifiers 16 and 17 to the positive conductor 18. The conductor 18 is connected to the input of a series regulator 19 and the output of the regulator is connected via the lead 20 to the positive output terminal 21.

In the instant embodiment of the invention, the series regulator 19 is represented as a transistor 22 having a collector 23 connected to the lead 18, an emitter 24 connected to the lead 20 and a base 25 connected by the lead 26 to an error signal network generally denoted by the numeral 27. The error signal network 27 is connected between the leads 14 and 20 and produces an error signal corresponding to variations in the output voltage which signal then modifies the conductivity of the transistor 22 in a manner to maintain the output voltage constant. While only a single transistor is shown as the series regulator, it is evident that such series regulator may assume any suitable form as, for instance, two or more transistors or other variable impedance means in series or parallel operation. One form of network for producing an error signal to operate the series regulator is shown in United States patent application, Ser. No. 81,978 entitled, Voltage Regulator Power Supply.

The control electrodes or gates 16′ and 17′ of the silicon controlled rectifiers 16 and 17 are connected through resistors 28 and 29, respectively, to a lead 30 for application of a control signal during each half cycle of the alternating current to cause rectifiers 16 and 17 to become conducting and apply a voltage between the leads 14 and 18 to charge the condenser 31. Generation of the control voltage for operating the silicon controlled rectifiers is accomplished by the unijunction transistor generally denoted by the numeral 32 together with the associated circuitry now to be described.

A stable reference voltage for the unijunction transistor 32 is provided by the power transformer generally denoted by the numeral 33 which has a primary winding 34 to which an alternating current is applied and a centertapped secondary 35. The centertap 36 is connected by lead 37 to the lead 18 of the main supply. The outer terminals of the secondary 35 are connected through rectifiers 38 and 39 and the unfiltered voltage appearing at the junction 40 is fed through a resistor 41 and a pair of zener diodes 42 and 43 connected in series and to the lead 18. The junction 44 between the zener diodes 42 and 43 is connected by the lead 45 to one base electrode 46 of the unijunction transistor 32. The second base 47 of this transistor is connected to the lead 30 and through a resistor 48 to the conductor 18.

The unijunction transistor 32 is rendered conducting at selected portions of each half cycle of the alternating current, and the resultant signal triggers the silicon controlled rectifiers which then conduct during the remainder of the half cycle of the alternating current. In this way, the magnitude of the voltage applied to condenser 31 can be controlled. Since the voltage on condenser 31 represents the input voltage to the series regulator 19, the voltage applied to the regulator is therefore directly controlled by the transistor 32.

Control of the transistor 32 is effected by condenser 49 which is connected between the emitter 50 of transistor 32 and the lead 18. In the instant embodiment of the invention, the rate at which the condenser 49 is charged is a function of the voltage drop across the series regulator 19. The upper terminal 49′ of condenser 49 is connected through a variable resistor 51 and a fixed resistor 52 to the junction 53 of the resistor 41 and the zener diodes 42 and 43. The terminal 49' is also connected through a pair of series resistors 54 and 55 to the lead 20. Resistor 54 is bridged by a fairly small condenser 56 of the order of 1/10 mfd. and a second condenser 57 is connected between the junction of resistors 54 and 55 and the lead 18. A diode 58 is connected in parallel with the resistor 55. As previously mentioned, the voltage drop across the regulator 19 is an indicator of the power being dissipated thereby and thus affords a desirable parameter for use in controlling transistor 32. It is to be understood, however, that the invention may utilize other voltage or current parameters to achieve similar results.

Before discussing the operation of the circuit described above, it is well recognized that, if the condenser 31 has a very large capacity of the order of at least hundreds of mfd.'s and the rectifiers 16 and 17 are conventional rectifiers, then the voltage appearing across the leads 14 and 18 will be substantially the peak value of the alternating current appearing across one-half of the secondary 12. Furthermore, if the rectifiers 16 and 17 are operated so that they become conducting at a point in time immediately following the peak value of their respective half cycles, then the maximum voltage appearing across the leads 14 and 18 will be of the order of magnitude of the instantaneous value of the alternating current at the moment each rectifier becomes conducting. Therefore, by controlling the silicon controlled rectifiers 16 and 17 so that they become conducting during selected portions of their respective half cycles, it is possible to control the direct current potential between the leads 14 and 18. This control is effected in accordance with the invention by the unijunction transistor 32 and the associated circuitry in the following manner.

The unijunction transistor 32 has one base 46 maintained at a fixed positive potential while the potential on the emitter 50 is controlled by the charge on condenser 49. When this charge reaches a predetermined positive value, the transistor 32 fires and the condenser 49 discharges through the transistor and applies a pulse to the gates 16' and 17' of rectifiers 16 and 17 causing one of them to conduct, while the next successive pulse occurring during the following half cycle will cause the other of them to conduct. The pulses produced by the unijunction transistor 32 will occur during each half cycle of the alternating current appearing across the secondary 12 of transformer 10 since both transformers 10 and 33 are energized in phase and preferably by the same source of alternating current.

Phasing of the pulses produced by the unijunction transistor 32 during each half cycle of the alternating current is accomplished by controlling the rate at which condenser 49 is charged. This is a function of the value of condenser 49, the relative values of resistors 52, 51 and 54, 55 and the relative values of the voltage appearing between the junction 53 and conductor 18, and the voltage drop across the series regulator 19. Since the two voltages are in series and are impressed across all four resistors in series and since the condenser 49 is connected between the junction of resistors 51 and 54 and the effective junction of the two series voltages, then, as the voltage across the series regulator 19 increases, the resultant voltage across condenser 49 decreases. This decreases the charging current and thereby increases the charge time to delay the firing of the unijunction transistor 32. The circuit constants are preferably arranged so that the firing of the transistor 32 will occur about the midpoint or peak of each rectified cycle and this can be adjusted by the variable resistor 51. Under these conditions, as the voltage drop across the series regulator increases, the firing pulses will be delayed beyond the peak value of the rectified voltage and thus reduce the voltage across condenser 31.

The condenser 57, which is of the order of tens of mfd.'s functions as a filter to smooth voltage variations occurring across the series regulator 19. Under normal conditions, when only slight variations of the output voltage occur, condenser 57 does not interpose any delay in response. If, however, the load connected to the output terminals 15 and 21 should suddenly increase, a considerable time delay would result as condenser 57 (about twenty-five mfd.) would have to be discharged through resistor 55 (about ten thousand ohms) and the series regulator 19. To overcome this difficulty and avoid momentary loss of control, the diode 58 is connected in parallel with resistor 55 and provides a very low impedance discharge path. This enables the attainment of a rapid response of the transistor 32 to changes in load.

Resetting of the transistor 32 and silicon controlled rectifiers 16 and 17 to their non-conductive states occurs automatically when the alternating current voltages become zero at the conclusion of each half cycle. For this reason, the reference voltage supply from transformer 33 is not filtered.

It will be observed from the circuit described above that the resistor 54 and condenser 49 actually constitute a low pass filter, and, as a consequence, the voltage developed across condenser 49 will lag the voltage changes across the series regulator 19. To correct this lag and secure a more rapid and precise response of the unijunction transistor 32, the small stabilizing condenser 56 is connected in parallel with resistor 54. The capacity of this condenser must be coordinated with the other circuit constants, and, in the instant embodiment of the invention wherein condenser 49 is approximately 0.1 mfd. and resistor 54 about fifty thousand ohms, then the condenser 56 would be about 0.1 mfd.

The foregoing circuit provides an economical, dependable and reliable mode of controlling the direct current voltage applied to the series regulator 19, and, since the circuit functions in response to the voltage across the series regulator, it is possible to maintain the power dissipation in the regulator at a minimum value at all times and thus minimize the chances of regulator failure. This not only enables the attainment of longer life but also reduces input power requirements, simplifies heat dissipation problems and materially reduces manufacturing, operating and maintenance costs.

While only one embodiment of the invention has been illustrated and described, it is apparent that alterations, modifications and changes may be made without departing from the true scope and spirit thereof as defined in the appended claims.

What is claimed is:

1. A regulated power supply comprising a first center-tapped source of alternating current, a pair of silicon controlled rectifiers interconnected with said source to produce full wave rectified alternating current, a filter condenser connected at one side to said rectifiers and at the other side to said centertap, a pair of output terminals, a series regulator connecting one side of said condenser to one of said output terminals, a connection between the other side of said condenser and the other of said output terminals, voltage sensing means connected between said output terminals and said series regulator to control the magnitude of the output voltage, a reference source of full wave unfiltered rectified alternating current, a connection between one side of said reference source and one side of said condenser to connect said voltages in additive relationship, a voltage divider comprising series connected impedances connected between the other side of said reference source and the output side of said series regulator, said voltage divider having at least one tap thereon, a control condenser connected between the input of said series regulator and said tap on said voltage divider, a unijunction transistor having an emitter and two bases, a connection between said emitter and said tap on the voltage divider, means connected with said reference source and one of said transistor bases to provide a fixed voltage to said base, and a connection between the other of said bases and said silicon controlled rectifiers, said control condenser upon being charged to a predetermined value causing said unijunction transistor to fire and apply a pulse to fire said silicon controlled rectifiers, said predetermined value being attained at approximately the midpoint of each half cycle when the voltage drop across the series regulator is low and at points beyond the midpoint of each half cycle as the voltage drop across the series regulator increases.

2. A regulated power supply comprising a first center-tapped source of alternating current, a pair of silicon controlled rectifiers interconnected with said source to produce full wave rectified alternating current, a filter condenser connected at one side to said rectifiers and at the other side to said centertap, a pair of output terminals, a series regulator connecting one side of said condenser to one of said output terminals, a connection between the other side of said condenser and the other of said output terminals, voltage sensing means connected between said output terminals and said series regulator to control the magnitude of the output voltage, a reference source of full wave rectified alternating current, a connection between one side of said reference source and one side of said condenser to connect said voltages in additive relationship, a voltage divider connected between the other side of said reference source and the output side of said series regulator, a control condenser connected between the input of said series regulator and a tap on said voltage divider, a unijunction transistor having an emitter and two bases, a connection between said emitter and said tap on the voltage divider, means connected with said reference source and one of said transistor bases to provide a fixed voltage to said base, and a connection between the other of said bases and said silicon controlled rectifiers, said control condenser upon being charged to a predetermined value causing said unijunction transistor to fire and apply a pulse to fire said silicon controlled rectifiers, said predetermined value being attained at approximately the midpoint of each half cycle when the voltage drop across the series regulator is low and at points beyond the midpoint of each half cycle as the voltage drop across the series regulator increases, said power supply further including a second filter condenser and diode connected in series across said series regulator and a connection between the junction of the last said condenser and diode to a second tap on said voltage divider, the last said condenser filtering the voltage sensed across said series regulator and said diode functioning to rapidly discharge the condenser should the load across said output terminals suddenly decrease.

3. A regulated power supply according to claim 2 including a stabilizing condenser connected between said taps on the voltage divider.

References Cited
UNITED STATES PATENTS

| | | | |
|---|---|---|---|
| 3,111,008 | 11/1963 | Nelson | 307—88.5 |
| 3,116,446 | 12/1963 | Heaby | 321—18 |
| 3,152,295 | 10/1964 | Schelbler | 307—88.5 |
| 3,213,351 | 10/1965 | Walker | 321—18 |
| 3,221,241 | 11/1965 | Greenberg et al. | 321—18 |

OTHER REFERENCES

Electronics: "Power Supply Uses Switching Preregulation," pp. 62–24.

JOHN F. COUCH, *Primary Examiner.*

M. L. WACHTELL, *Assistant Examiner.*